United States Patent Office 3,086,022
Patented Apr. 16, 1963

3,086,022
1,4-BIS(POLYALKYL SUBSTITUTED-4-HYDROXY-4-PIPERIDYL) BUTANES
Robert I. Meltzer, Rockaway, and Wilson B. Lutz, Florham Park, N.J., assignors to Warner-Lambert Pharmaceutical Company, Morris Plains, N.J., a corporation of Delaware
No Drawing. Filed Sept. 25, 1961, Ser. No. 140,214
3 Claims. (Cl. 260—294.7)

The present invention relates to new and novel piperidine derivatives having the formula

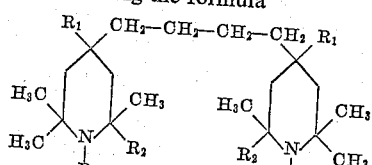

wherein $R_1$ is hydrogen or hydroxyl, $R_2$ is hydrogen or methyl and $R_3$ is hydrogen or lower alkyl, and to the pharmaceutically acceptable non-toxic acid addition and quaternary ammonium salts thereof.

The compounds of our invention having the above formula have been found to possess significant pharmacological activity in lowering blood pressure. Moreover, they are valuable intermediates in the production of other piperidine derivatives.

We have now found that those compounds of our invention having the formula

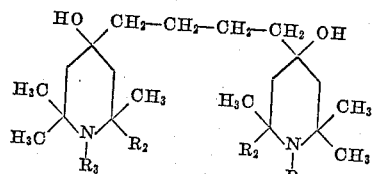

in which $R_2$ and $R_3$ are as described hereinabove may be prepared by the catalytic hydrogenation of compounds of the formula

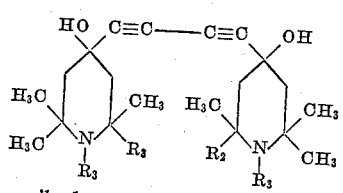

which are described and claimed in our application Serial No. 140,213, filed September 25, 1961 entitled "Piperidine Derivatives," filed concurrently herewith. Palladium, platinum or mixtures thereof constitute useful catalysts in the hydrogenation which is carried out in a solvent such as aqueous acetic acid.

We have also found that those compounds of our invention having lower alkyl substituents on the piperidine nitrogen atoms may be prepared from the corresponding compounds having hydrogen substituents on the nitrogen atoms by conventional alkylation techniques.

Those compounds of our invention having the formula

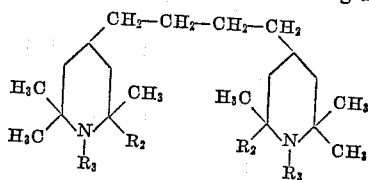

may be prepared from the corresponding compounds having hydroxyl substituents at the 4 positions of the piperidine rings by the steps of dehydration to form a diene followed by catalytic hydrogenation. Dehydration is effected by boiling in 20 percent sulfuric acid. Hydrogenation in aqueous acetic acid at high pressures (1800–1900 p.s.i.) is effective in producing the desired product.

The compounds of our invention may be readily converted by conventional procedures into their pharmaceutically acceptable non-toxic acid addition and quaternary ammonium salts. Useful acid addition salts are those of such acids as maleic, oxalic, citric, acetic, methylsulfonic, p-toluenesulfonic, sulfonic, sulfuric, phosphoric, cinnamic, hydrochloric, hydrobromic and the like. Useful quaternaries are formed with such reactive halides or esters as methyl iodide, n-hexyl bromide, benzyl chloride, methyl sulfate, ethyl sulfate, methyl p-toluenesulfonate and the like.

For therapeutic use, our new and novel compounds, either as the free base or in the form of a salt, may be formulated with a conventional pharmaceutical carrier to form tablets, capsules, elixirs, solutions, suspensions, suppositories and the like.

The following examples are included in order further to illustrate our invention:

EXAMPLE 1

*1,4-Bis(2,2,6,6-Tetramethyl-4-Hydroxy-4-Piperidyl)Butane*

1,4-bis(2,2,6,6-tetramethyl-4-hydroxy - 4 - piperidyl)-butadiyne (1.84 g., 0.005 mole) is dissolved in 50 ml. of 4:1 acetic acid-water and shaken in a Parr apparatus with hydrogen in the presence of a mixture of 10% palladium on charcoal and 5% platinum on charcoal. Initial pressure is 40 p.s.i. and uptake ceases when about four moles of hydrogen have been absorbed. The catalysts are then filtered, the filtrate basified, and the product extracted with ethyl acetate. Evaporation of the solvent gives crude material which is recrystallized from 90–97° petroleum ether to give 1.8 g. (97%) of white needles M.P. 128–130°.

An additional recrystallization from petroleum ether followed by sublimation of the product, gives analytically pure material, M.P. 128–129°.

*Analysis.*—Calc.: C, 71.68; H, 12.03; N, 7.60. Found: C, 71.67; H, 12.14; N, 7.62.

EXAMPLE 2

*1,4-Bis(1,2,2,6,6-Pentamethyl-4-Hydroxy-4-Piperidyl)Butane*

A mixture of 7.37 g. (0.02 mole) of 1,4-bis(2,2,6,6-tetramethyl-4-hydroxy - 4 - piperidyl)butane, 32 ml. of 37% aqueous formaldehyde and 15 ml. of formic acid are heated at steam bath temperature for two days. Basification with 10 M potassium hydroxide gives a gummy solid which is triturated with boiling 90–97° ligroin. The extract on cooling deposits 7.56 g. (95%) of white crystals, M.P. 120–122°.

An analytical sample, M.P. 122–123° is obtained by recrystallizing similar material twice from ligroin and subliming the product.

*Analysis.*—Calc.: C, 72.67; H, 12.20; N, 7.06. Found: C, 72.59; H, 12.22; N, 7.01.

EXAMPLE 3

*1,4-Bis(1,2,2,6,6-Pentamethyl-4-Piperidyl)Butane*

A quantity of 9.2 g. of 1,4-bis(1,2,2,6,6-pentamethyl-4-hydroxy-4-piperidyl)butane is refluxed for 6½ hours in 300 ml. of 20% sulfuric acid. The resulting crude diene is then hydrogenated for two days without preliminary isolation at an initial pressure of 40 p.s.i. in the presence of platinum and palladium on charcoal. The solution is then made basic with 10 M potassium hydroxide and the precipitated product collected along with a large amount of potassium sulfate. The filter cake is treated with a little dilute hydrochloric acid and the inorganic material removed by filtration. The filtrate is basified and the product extracted into ether. Evaporation of the dried ether solution yields 8.3 g. of a crude product M.P. 115–116°, which reacts rather rapidly with potassium permanganate in acetone indicating incomplete hydrogenation. Recrystallization from methanol raises the M.P. to 116–117°. However, a potassium permanganate test for unsaturation is still positive. An additional recrystallization raises the M.P. to 118.6–119.4°. Infrared analysis indicates the absence of hydroxyl groups; hence the probable impurity is assumed to be olefinic material rather than undehydrated substances.

The remaining material is then subjected to high pressure hydrogenation in 25% acetic acid at 1800–1900 p.s.i. over a mixture of platinum and palladium on charcoal. Upon basification of the filtered solution the product crystallizes. After recrystallization from methanol it melts at 120–121°. Treatment with gaseous hydrogen chloride in ether yields a dihydrochloride salt, M.P. 276–277°. One recrystallization from ethanol-ethyl acetate and four recrystallizations from 2-propanol yield 2.5 g. (25%) of the purified dihydrochloride of 1,4-bis(1,2,2,6,6 - pentamethyl - 4 - piperidyl)butane, M.P. 289–290° (dec.).

*Analysis.*—Calc.: C, 65.87; H, 11.52; N, 6.40. Found: C, 65.60; H, 11.46; N, 6.70.

In the foregoing examples, all temperatures are given in degrees centigrade.

It is understood that the foregoing detailed description is given merely by way of illustration and that many variations may be made therein without departing from the spirit of our invention.

Having described our invention what we desire to secure by Letters Patent is:

1. A member selected from the group consisting of compounds of the formula

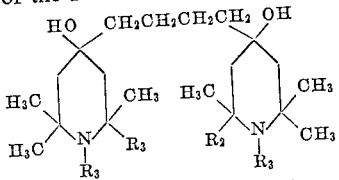

wherein $R_2$ is a member selected from the group consisting of hydrogen and methyl and $R_3$ is a member of the group consisting of hydrogen and lower alkyl, and the non-toxic pharmaceutically acceptable acid addition salts thereof.

2. 1,4-bis(2,2,6,6-tetramethyl - 4 - hydroxy - 4 - piperidyl)butane.

3. 1,4-bis(1,2,2,6,6-pentamethyl-4-hydroxy - 4 - piperidyl)butane.

References Cited in the file of this patent

UNITED STATES PATENTS 2,624,735    Goldberg et al. ---------- Jan. 6, 1953

FOREIGN PATENTS 103,541    Great Britain ------------ Feb. 1, 1917